May 27, 1924.
A. E. ANDERSON
1,495,144
WIRE ROPE MACHINE
Filed March 7, 1922
2 Sheets-Sheet 1
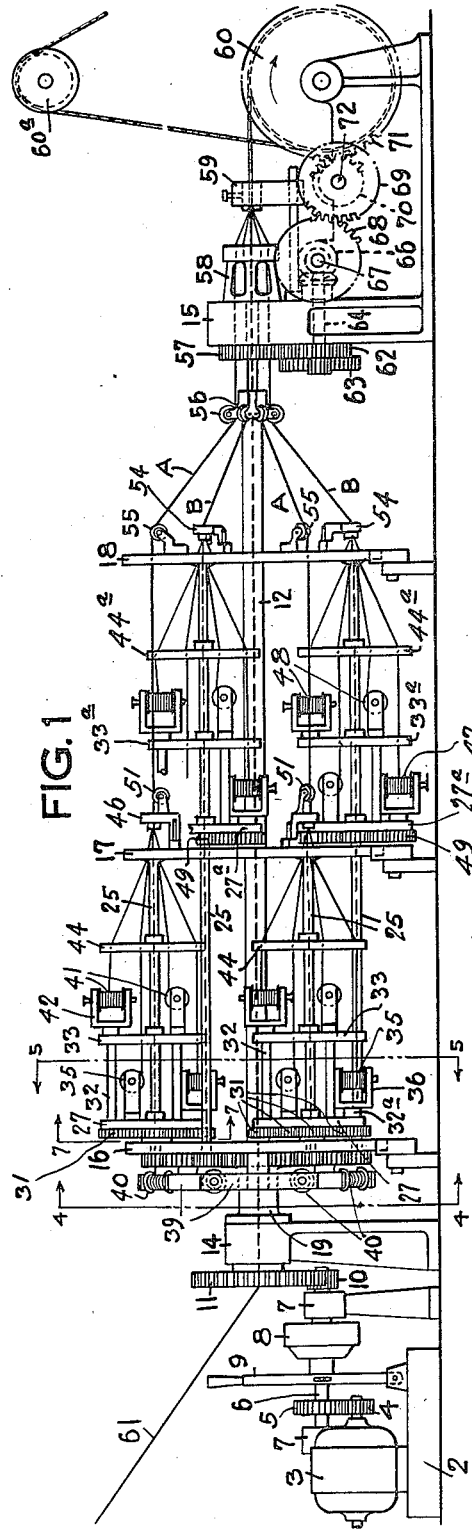
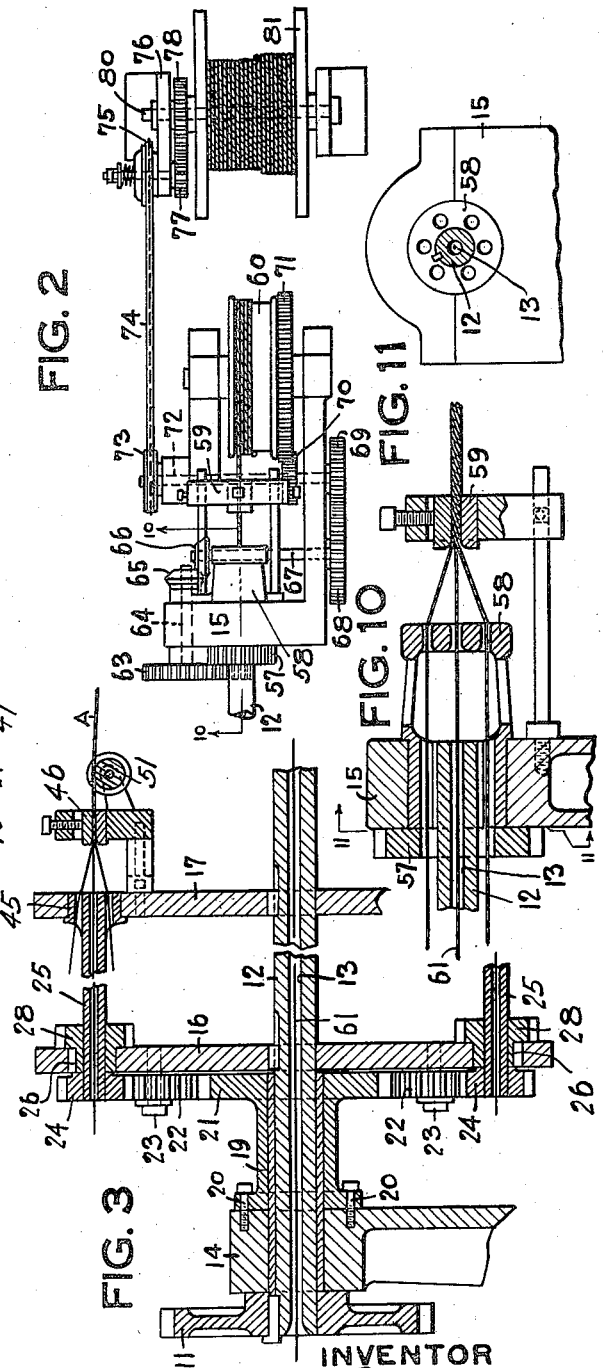
INVENTOR
Albin E. Anderson
By Kay Totten Bram
attys May 27, 1924.
A. E. ANDERSON
1,495,144
WIRE ROPE MACHINE
Filed March 7, 1922
2 Sheets-Sheet 2
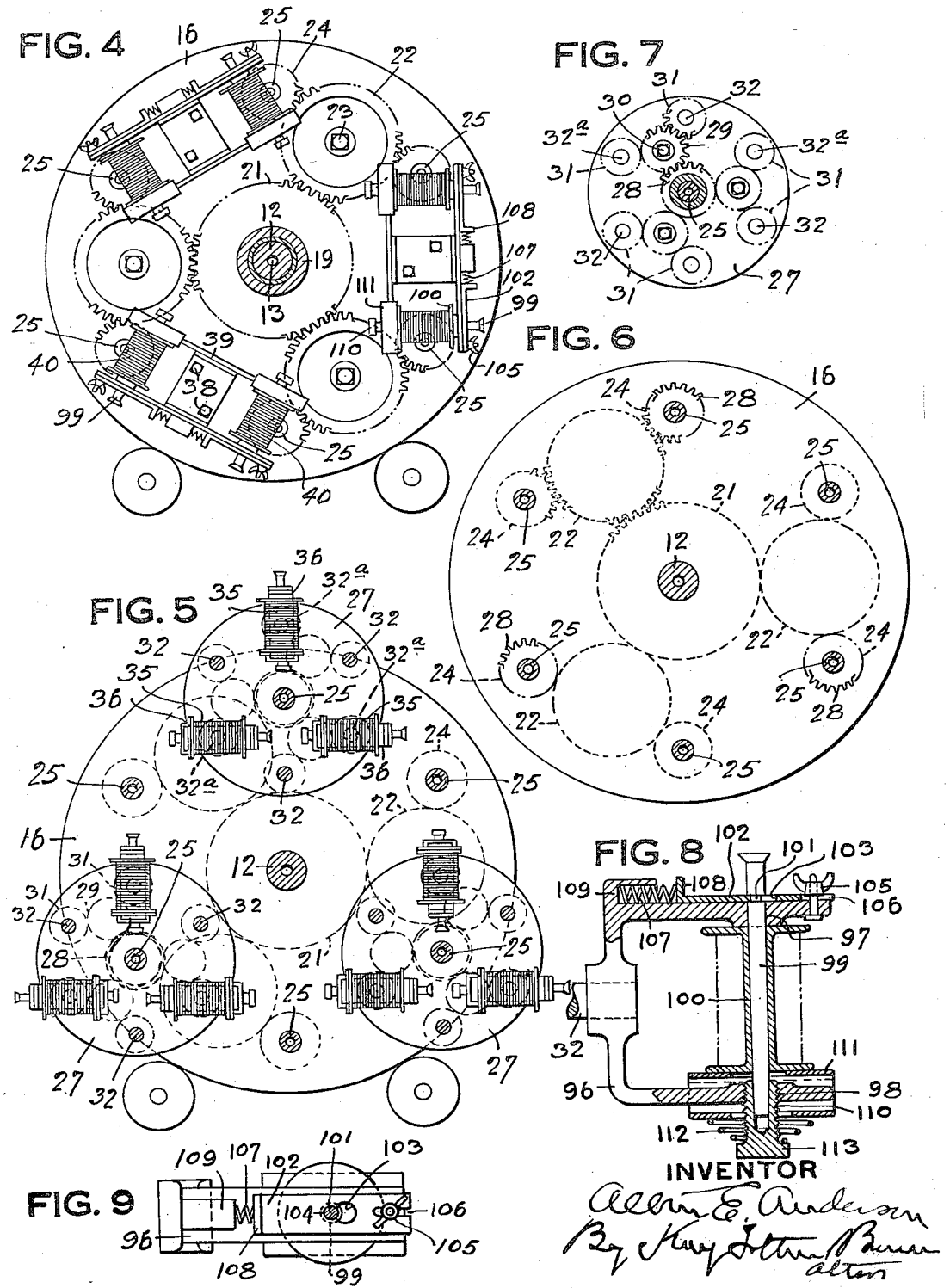

Patented May 27, 1924.

1,495,144

UNITED STATES PATENT OFFICE.

ALBIN E. ANDERSON, OF OAKMONT, PENNSYLVANIA, ASSIGNOR TO WIRE PRODUCT CORPORATION, OF OAKMONT, PENNSYLVANIA, A CORPORATION OF PENNSYLVANIA.

WIRE-ROPE MACHINE.

Application filed March 7, 1922. Serial No. 541,795.

*To all whom it may concern:*

Be it known that I, ALBIN E. ANDERSON, a citizen of the United States, and resident of Oakmont, in the county of Allegheny and State of Pennsylvania, have invented a new and useful Improvement in Wire-Rope Machines; and I do hereby declare the following to be a full, clear, and exact description thereof.

My invention relates to wire rope machine.

In the accompanying drawings Fig. 1 is a side elevation of my improved machine; Fig. 2 is a plan view of the main twister and the winding drum, together with connections to the reel on which the finished wire is wound; Fig. 3 is an enlarged section of a portion of two of the discs and the driving connections therefor; Fig. 4 is an enlarged section on the line 4—4, Fig. 1; Fig. 5 is an enlarged section on the line 5—5, Fig. 1; Fig. 6 is a diagonal face view of one of the discs; Fig. 7 is a diagrammatic face view of one of the smaller discs; Figs. 8 and 9 show details of a manner of securing the bobbins or spools in place in their frames; Fig. 10 is an enlarged section of the main twister head, and showing the wires leading thereto; and Fig. 11 is a face view of the guide leading to the main twister head.

In the drawings the numeral 2 designates a suitable base on which a motor 3 is mounted. The pinion 4 on the motor shaft drives the gear 5 on the shaft 6 mounted in bearings 7. A suitable clutch 8 is provided operated by the lever 9 by means of which power to operate the machine is thrown on and off. A pinion 10 at the outer end of the shaft 6 meshes with the gear 11 keyed to the shaft 12 which has the passage 13 extending through it. The shaft 12 is mounted in bearings 14 and 15, and keyed at intervals to said shaft are the main transverse members or discs 16, 17 and 18, which with said shaft form the frame.

A sleeve 19 is mounted on the shaft 12, said sleeve being secured to the bearing 14 by the screws 20. Formed integral with the sleeve 19 is the gear 21, said gear meshing with the pinions 22 mounted on short studs 23 on the main disc 16. The pinions 22 mesh with pinions 24 on the hollow shafts 25 which pass through bearings 26 in the disc 16.

Keyed to the shafts 25 are the small discs or transfer members 27. Formed integral with the bearings 26 are the gears 28 through which the shafts 25 pass, said gears meshing with the pinions 29 on the studs 30 on the small discs 27. The pinions 29 mesh with the pinions 31 on the shafts 32 and on the stub shafts 32ª, the shafts 32 extending through bearings in the small discs 33.

The small discs 27 carry the bobbins 35 mounted in brackets 36 mounted on the stub shafts 32ª journaled in the discs 27.

Secured to the outer face of the large disc 16 by means of the bolts 38 are the bobbin-brackets 39 in which the bobbins 40 are mounted. The wires from the bobbins 40 pass through the hollow shafts 25.

The small discs 33 also carry bobbins 41 mounted in brackets 42, said brackets being mounted on the shafts 32 on said discs. The wires from these bobbins pass through openings in the discs 33 and 44, and through the guides 45 in the shafts 25 journaled in the disc 17 and then lead to the twister heads 46 just beyond said guides which are carried by the disc 17 where the several wires are twisted into a single strand designated by the letter A.

It will be noticed that there are six shafts designated by the numeral 25, and three of these shafts terminate in the large disc 17, while three extend through the disc 17 and terminate in the disc 18. Mounted in the shafts 25 which extend between discs 17 and 18 are the small discs 27ª, 33ª and 44ª corresponding in all respects to the discs 27, 33 and 44; the disc 27ª carrying bobbins 47, and the disc 33ª carrying bobbins 48, said bobbins being revolved by a planetary system of gearing carried on the discs 27ª in the same manner as the gears on the discs 27, said gears being generally indicated by the numeral 49. The wires from the bobbins 47 and 48 pass through openings in the discs 33ª and 44ª and through openings in the shafts 25 journaled in the large disc 18, thence through the twister head 54 where said wires are twisted into a single strand designated by the letter B.

The twisted wires A from the bobbins 35 and 41 pass over sheaves 51 which are carried by the twister heads 46, and thence through openings in the large disc 18 over the pulleys 55 to the pulleys 56 on the shaft 12, strand B also passing from the twisters 54 to the pulleys 56. The twisted strands A and B lead from said pulleys 56 through the gear 57 into the rotary twister 58 which is keyed to shaft 12, and thence to the twister block 59 which completes the rope made up of the wires coming from the different bobbins and the core 61 of hemp which passes through the central drive shaft 12.

In order to draw the finished cable through the twister head 59 and wind the finished cable in a reel, the cable is passed around a tension drum 60 several wraps in order to prevent slippage thereon. The cable is then led overhead to a pulley 60ª and then down to a reel 81. The tension drum and reel are rotated from the drive shaft by the following gear and sprocket drive connections:

Gear 57, keyed to shaft 12, drives a double gear 62 carried on a stud on the housing 15. The pinion portion of the double gear drives a gear 63 on a shaft 64, said shaft having the bevel gear 65 meshing with a bevel gear 66 on the shaft 67, said shaft being connected by a train of gears 68, 69, 70 and 71 to the tension drum 60. Gear 70 is mounted on a shaft 72 which also carries gear 69, and on said shaft is mounted a sprocket wheel 73 which is connected up by sprocket chain 74 to a slip sprocket 75 mounted on the reel housing 76. The shaft upon which said slip sprocket is mounted has keyed thereto the gear 77 which meshes with the gear 78 on the reel shaft 80 of reel 81.

I have devised a novel form of supports for the bobbins, as illustrated in Figs. 8 and 9, which I will now describe.

The yoke or bracket 96 has the openings 97 and 98 through which the axle 99 passes upon which the reel 100 is loosely mounted. The axle 99 is provided with the annular groove 101 adapted to be engaged by the slidable latch member 102. This latch member is provided with the opening consisting of the enlarged portion 103 and the reduced portion 104 to receive the full diameter of said axis, and the reduced diameter caused by the annular groove 101, respectively. The latch 102 is held in place by the set screw 105 which engages the slot 106 in said latch. The spring 107 is interposed between the abutment 108 on said latch and the stop 109 on the bracket 96.

A thimble 110 engages the threaded opening 98 in the bracket and said thimble receives the inner end of the axle 99. A bearing member 111 is provided which forms a yielding abutment for the inner end of the bobbin 100 and a spring 112 is interposed between said bearing member and the head 113 of the thimble. The action of said spring is to normally hold the bobbin in position and yet allow the yielding of the same when pressure of the spring 112 is overcome.

In inserting the bobbin in the bracket 96, the bobbin is inserted between the arms of the bracket with one arm bearing against the bearing member 111, whereupon the axle 99 is inserted through the enlarged portion 103 of the opening in the latch 102, said latch being moved over to permit of the insertion of said axle. The axle 99 is then locked into position by allowing the latch to move over to bring the reduced portion 104 of the opening in said latch in a position to engage the annular portion 101 of the axle. The set screw 105 may then be tightened to hold the axle securely in place. By having the bobbin yieldingly mounted in this manner the bobbin is permitted to conform to the strains brought upon it by the unreeling of the wire therefrom, and furthermore bobbins of different lengths may be used in the same bracket.

In the operation of my improved machine, the core 70 formed of hemp is passed through the main hollow shaft 12 and the wires from the several bobbins are wound around said core. When the machine is put in operation the large discs 16, 17 and 18 are rotated, and through the gearing described rotation is imparted to the small discs 27, 33 and 44. The wires from the bobbins located between the two large discs 16 and 17 are guided by the guides 45 in said large disc 17 and into position to enter the twisters, and the core wires for said twisters are taken from the bobbins 40 on the large disc 16 through the hollow shafts 25.

The discs 27ª, 33ª and 44ª are rotated by the gear mechanism described and the wires from the bobbins 47 and 48 on said discs are guided by the guides 18ª in the large disc 18 and thence to the twisters 54, and the core wires for said twisters are taken from the bobbins 40 through the hollow shafts. Beyond the large disc 18 the wires previously twisted are delivered to the twister 58 and the twister head 59 and thence around the tension drum 85 which draws the wire through the machine.

What I claim is:

1. In a wire rope machine the combination of a main hollow shaft, transverse members mounted on the shaft to rotate therewith, countershafts connecting said members, a double series of transverse members carried by said countershafts, a second series of countershafts carried by said last-named transverse members, means for rotating said shafts, bobbins carried on said last-named shafts, twisting devices, and means for directing the wires from said bobbins to said twisting devices.

2. In a wire rope machine the combination of a main hollow shaft, transverse members mounted on the shaft to rotate therewith, countershafts connecting said members, a double series of transverse members carried by said countershafts arranged in tandem, the members of one series alternating with the members of the other series with respect to their circumferential spacing, a second series of transverse members carried by said last-named transverse members, means for rotating said shafts, bobbins carried on said last-named shafts, twisting devices, and means for directing the wires from said bobbins to said twisting devices.

3. In a wire-rope machine the combination of a main shaft, a frame mounted on said shaft to rotate therewith, comprising a plurality of transverse disc members, hollow counter-shafts extending from one disc member to the other, means for rotating said shafts from said main shaft, a series of smaller transverse members between two of said first members on half of said last named shafts, bobbins carried by the first of said transverse members in position for the wires from said bobbins to pass through said hollow shafts, a second series of transverse members beyond the second of the first transverse members on the remaining hollow shafts, bobbins carried by said second series of transverse members, twisting devices, and means for directing the wires to said twisting devices.

4. In a wire rope machine, the combination with the flyer frame, of a bobbin bracket carried thereby, an axle mounted in said bracket, a spool on said axle, said axle having a recess formed therein, a slidable latch adapted to engage said recess, and positive means for securing said latch in place.

In testimony whereof, I, the said ALBIN E. ANDERSON, have hereunto set my hand.

ALBIN E. ANDERSON.

Witnesses:
JOHN F. WILL,
HENRY HOLZ.